(12) United States Patent
Ludwig et al.

(10) Patent No.: US 12,429,835 B2
(45) Date of Patent: Sep. 30, 2025

(54) ENDPOINT REGISTRY ACROSS ECOSYSTEMS

(71) Applicant: Siemens Aktiengesellschaft, Munich (DE)

(72) Inventors: Hartmut Ludwig, West Windsor, NJ (US); Florian Ersch, Plainsboro, NJ (US); Michael Jaentsch, Princeton, NJ (US); Lingyun Wang, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 405 days.

(21) Appl. No.: 18/043,454

(22) PCT Filed: Aug. 31, 2020

(86) PCT No.: PCT/US2020/048715
§ 371 (c)(1),
(2) Date: Feb. 28, 2023

(87) PCT Pub. No.: WO2022/046098
PCT Pub. Date: Mar. 3, 2022

(65) Prior Publication Data
US 2023/0350358 A1    Nov. 2, 2023

(51) Int. Cl.
*G05B 15/02* (2006.01)
*G05B 19/04* (2006.01)
(Continued)

(52) U.S. Cl.
CPC ............ *G05B 15/02* (2013.01); *G05B 19/042* (2013.01); *G06F 8/70* (2013.01); *G06F 9/54* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 7,151,966 B1 * | 12/2006 | Baier | H04L 67/51 700/19 |
| 7,778,713 B2 * | 8/2010 | Grgic | G05B 19/042 700/19 |

(Continued)

FOREIGN PATENT DOCUMENTS

| | | |
|---|---|---|
| CN | 103839138 A | 6/2014 |
| CN | 107885604 A | 4/2018 |
| WO | 2020172089 A1 | 8/2020 |

OTHER PUBLICATIONS

Venanzi et al., "Industry 4.0 Solutions for Interoperability: a Use Case about Tools and Tool Chains in the Arrowhead Tools Project", 2020, 2020 IEEE International Conference on Smart Computing (SMARTCOMP). (Year: 2020).*

(Continued)

*Primary Examiner* — Mohammad Ali
*Assistant Examiner* — Kelvin Booker

(57) ABSTRACT

Service interfaces and data topics can be discovered and retrieved so as to bridge different industrial automation ecosystems, programming languages, platforms, and the like, together. For example, nodes of one ecosystem can discover endpoints (e.g., interfaces and topics) across heterogeneous incompatible ecosystems, without changing the ecosystem. Further, endpoint descriptions are managed across heterogeneous incompatible ecosystems. Endpoint descriptions can be automatically generated based on interface and topic description in an interface description file. Such descriptions can also be automatically exported into registries of other ecosystems.

8 Claims, 4 Drawing Sheets

(51) Int. Cl.
 G06F 8/70 (2018.01)
 G06F 9/54 (2006.01)
 G06Q 10/06 (2023.01)
 G05B 19/042 (2006.01)

(56) References Cited

U.S. PATENT DOCUMENTS

| | | | | |
|---|---|---|---|---|
| 7,778,714 | B2* | 8/2010 | Grgic | G05B 19/042 |
| | | | | 700/19 |
| 7,899,559 | B2* | 3/2011 | Grgic | G06F 9/505 |
| | | | | 700/20 |
| 9,217,998 | B2* | 12/2015 | Plache | G05B 19/4188 |
| 10,007,513 | B2* | 6/2018 | Malladi | G06F 8/70 |
| 10,193,753 | B1* | 1/2019 | Tabet | H04L 41/0843 |
| 10,248,914 | B2* | 4/2019 | Stoughton | G06Q 10/06 |
| 10,559,977 | B2* | 2/2020 | Kim | H02J 13/00022 |
| 2007/0124189 | A1* | 5/2007 | Stoughton | G06Q 10/06 |
| | | | | 705/305 |
| 2008/0208364 | A1* | 8/2008 | Grgic | G06F 9/5077 |
| | | | | 700/2 |
| 2008/0208368 | A1* | 8/2008 | Grgic | G05B 19/042 |
| | | | | 700/20 |
| 2010/0250497 | A1* | 9/2010 | Redlich | G06Q 10/06 |
| | | | | 707/661 |
| 2010/0312571 | A1* | 12/2010 | Cornford | G06Q 99/00 |
| | | | | 705/500 |
| 2011/0022192 | A1* | 1/2011 | Plache | G05B 19/4188 |
| | | | | 700/28 |
| 2019/0109713 | A1* | 4/2019 | Clark | G06F 16/182 |
| 2020/0351337 | A1* | 11/2020 | Calmon | G06F 9/45558 |
| 2020/0374700 | A1* | 11/2020 | Smith | H04L 9/3268 |
| 2022/0128980 | A1* | 4/2022 | Ludwig | G06F 9/5027 |
| 2023/0350358 | A1* | 11/2023 | Ludwig | G05B 15/02 |

OTHER PUBLICATIONS

Gasser et al., "Interoperability in the Digital Ecosystem", Jul. 2015, Research Publication No. 2015-13, The Social Science Research Network Electronic Paper Collection. (Year: 2015).*

Amjad et al., "A Systematic Review on the Data Interoperability of Application Layer Protocols in Industrial IoT", Jun. 2021, Digital Object Identifier 10.1109/ACCESS.2021.3094763. (Year: 2021).*

Fraile et al., "Trustworthy Industrial IoT Gateways for Interoperability Platforms and Ecosystems", Dec. 2018, IEEE Internet of Things Journal, vol. 5, No. 6. (Year: 2018).*

Vermesan, O., "Advancing IoT Platforms Interoperability", 2018, River Publishers. (Year: 2018).*

Thuluva et al., "Semantic Node-RED for rapid development of interoperable industrial IoT applications", Semantic Web 11 (2020) 949-975. (Year: 2020).*

* cited by examiner

```
interface IPickPlace
{
   import = NULL
   include = NULL struct Position
   {
      Float x
      Float y
      Float z
   }
   struct Rotation
   {
      uInt32 a
      uInt32 b
      uInt32 c
   }

@uuid 1234f214-adfz-24g1-2ga1-dsgfasdfd001
   move(in Position *position, in Rotation *rotation, out Bool success )
} topic AxisPosition
{
   Position position
   Rotation rotation
}

@generate true
plugin UR5
{
    import = NULL
    include = NULL
    provide IPickPlace
    provide AxisPosition:Gripper,Arm
}

@generate true
plugin IIWA
{
    import = NULL
    include = NULL
    provide IPickPlace
    provide AxisPosition:Gripper
}
```

FIG. 3

ENDPOINT REGISTRY ACROSS ECOSYSTEMS

BACKGROUND

Automation systems can be used to control the operation of machines and other components in a systematic manner. Automation systems can include various automation domains such as factory automation, process automation, building automation, energy automation, and the like. Automation systems can also include equipment from multiple vendors. In some cases, equipment and machines within an automation system may use varying mechanisms associated with their respective ecosystems, such as varying runtime environments, protocols, and programming languages (e.g., vendor-specific programming languages). By way of example, automation functions or services are often platform specific and/or are implemented in a proprietary manner.

In some cases, to access a given service, clients (or consumers) can communicate with an endpoint that is connected to the service. In particular, endpoints often can represent a service that can be consumed by clients. It is recognized herein, however, that automation systems often include distributed, heterogenous environments or ecosystems, which can hinder capabilities related to consumers discovering and using various endpoints within such automation systems.

BRIEF SUMMARY

Embodiments of the invention address and overcome one or more of the described-herein shortcomings or technical problems by providing methods, systems, and apparatuses that enable consumers to discover and use endpoints. Such endpoints can represent service interfaces and data topics.

In an example aspect, a system is configured to register and discover endpoints from a plurality of heterogenous ecosystems that define respective physical assets and automation equipment configured to control the physical assets. The system can include a processor executing modules, and memory for storing the modules. The modules an include an endpoint registry configured to store a plurality of endpoints associated with the plurality of heterogenous ecosystems. The endpoint registry can be further configured to provide the plurality of endpoints to any of the plurality of heterogenous ecosystems. The modules can further include a first discovery component of a first ecosystem of the plurality of heterogenous ecosystems. The first discovery component can be configured to register a first endpoint with the endpoint registry. The first ecosystem can define a first programming language native to the automation equipment of the first ecosystem. The modules can further include a second discovery component of a second ecosystem of the plurality of heterogenous ecosystem that is different than the first ecosystem. The second discovery component can be configured to discover the first endpoint in the endpoint registry. The second ecosystem can define a second programming language native to the automation equipment of the second ecosystem that is different than the first programming language. In various examples, the first endpoint defines a first service interface for interoperating with the first ecosystem, and a first data topic associated with the first ecosystem.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 3 shows example endpoint definitions that can generate endpoint entries in the endpoint registry in accordance with an example embodiment.

DETAILED DESCRIPTION

As an initial matter, endpoints described herein can represent an interface, for instance a service interface, or a data topic (e.g., data set). Thus, endpoints or information concerning endpoints can be used interchangeably herein with services or topics, unless otherwise specified. Service interfaces and data topics can be consumed by clients or consumers. Clients and consumers can be used interchangeably herein without limitation, unless otherwise specified. In accordance with various embodiments, endpoints that can be discovered and used by clients are deployed across multiple ecosystems that may have incompatibilities with one another. In various examples, endpoints can also be added, removed, or changed.

It is recognized herein that service registries are often used in microservice architectures to maintain information (e.g., key value databases) concerning available microservices. Clients (e.g., consumers of services) can use such service registries to discover and subsequently bind to a microservice instance. Before clients can discover such microservices, the microservices announce their existence to the service registry, for instance via an endpoint registration. It is recognized herein that such service registries can be limited in that clients and providers might need to agree so as to integrate with only one endpoint registry implementation. Thus, in some cases, clients and providers lock-in to one specific ecosystem. It is also recognized herein that such service registries can be further limited in that they are not applied to existing, heterogenous brownfield applications, such that services can be shared across ecosystems. Further still, it is recognized herein that current endpoints typically define interfaces without data topics.

In various embodiments described herein, service interfaces and data topics can be discovered and retrieved so as to bridge different ecosystems, programming languages, platforms, and the like, together. For example, nodes of one ecosystem can discover endpoints (e.g., interfaces and topics) across heterogeneous incompatible ecosystems, without changing the ecosystem. Further, endpoint descriptions are managed across heterogeneous incompatible ecosystems. Endpoint descriptions can be automatically generated based on interface and topic description in an interface description file. Such descriptions can also be automatically exported into registries of other ecosystems. Thus, in accordance with various embodiments described herein, ecosystem owners can focus on their own business logic in their preferred platforms without having to use resources for integration. By way of example, a supplier can design robots that perform pick and place functions, a factor owner can develop an automation system that performs an assembly, and mechanisms that enable the robots and the automation system to interoperate with each other can be automatically generated in accordance with embodiments described herein.

Figure 1:
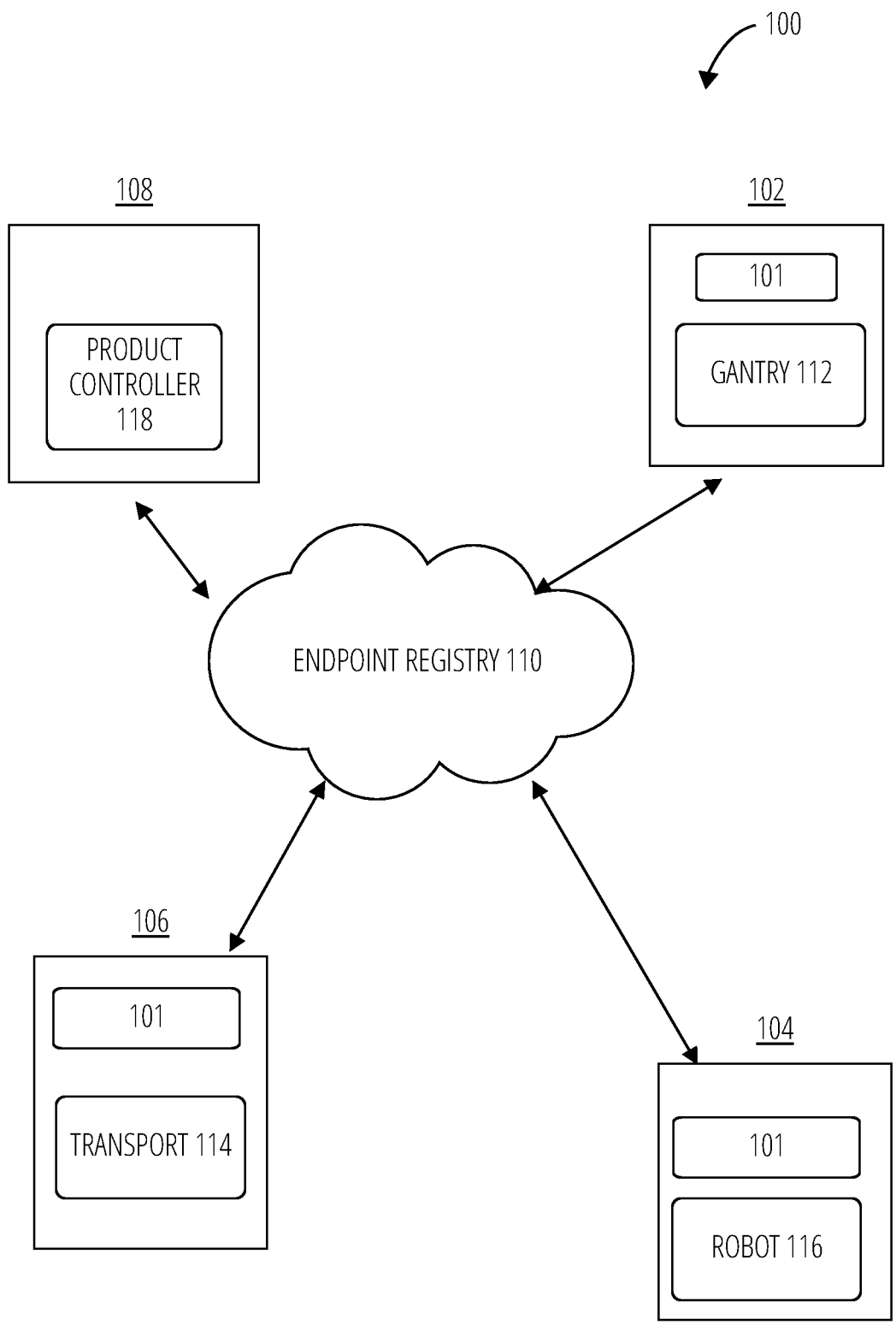
FIG. 1 is a block diagram that illustrates an example automation system that includes an endpoint registry that is accessible across different ecosystems in accordance with an example embodiment.

Referring to FIG. 1, an example automation system 100 defines a plurality of ecosystems or domains. In particular, the example system 100 can include a product ecosystem 108, a production ecosystem 102, a production ecosystem 104, and a production ecosystem 106. The example industrial system 100 can define or be part of a factory, such as a factory for manufacturing or assembling various products. In accordance with the example, the production ecosystem 102 includes a gantry station 112, the production ecosystem 104 includes a robot station 116, and the production ecosystem 106 includes a transport station 114, though it will be understood that the production ecosystems can include any stations as desired. It will further be understood that while four ecosystems of the example automation system 100 are illustrated, automation systems described herein may include any number of ecosystems, and all such systems are contemplated as being within the scope of this disclosure.

Each ecosystem can include physical assets that can be controlled by automation equipment 101 configured to control the respective physical assets. Such automation equipment can include one or more programmable logic controllers (PLCs). The automation equipment may be specific to one or more physical assets in the respective ecosystem. The automation system 100 can be configured to perform various automation functions. The automation system 100 can further define an endpoint registry 110. The endpoint registry 110 can share endpoints across the various ecosystems 102, 104, 106, and 108. Thus, as further described herein, the endpoint registry 110 can share endpoints across multiple, otherwise incompatible heterogeneous ecosystems, so as to enable such ecosystems to interoperate with one another.

For example, each production ecosystem 102, 104, and 106 of the industrial automation system 100 can offer or provide various production skills so as to perform various industrial tasks, such as for example pick and place, transport, assembly, or the like. The product ecosystem 108 can use or consume one or more of the production ecosystems 102, 104, and 106 to assemble or manufacture one or more products. With continuing reference to FIG. 1, in some cases, the gantry station 112, robot station 116, and transport station 114 can each be provided from different equipment vendors, which can create interoperability issues addressed herein, among other challenges. By way of example, the product ecosystem 102 can include automation equipment, for instance a product controller 118, that is associated with a product that is assembled or manufactured by the industrial automation system 100. By way of example, the product controller 118 can be PC-based, and can be programmed by a first programming language, such as C for example. The product controller 118 can perform various activities during the lifecycle of a given product. For example, during a design state, a desired state of a given product can be established within the product controller 118. The desired state may refer to the overall condition of a product or machine during or after production. The desired state may indicate various information such as, for example, absolute position information, position information relative to other physical assets, temperature limitation, stress level limitations, or the like. The desired state may be determined from inputs to the product controller 118 such as, for example and without limitation, a Bill of Process (BOP), Bill of Materials (BOM), properties of the materials, and 3D models (e.g., CAD models) or other physical models of the product.

The gantry station 112 can be controlled by automation equipment 101 that is programmed in a second programing language that is different than the first programming language of the product controller 118. By way of example, the automation equipment 101 of the gantry station 112 may define one or more programmable logic controllers from Siemens (e.g., SIMATIC S7-1517) that are programmed in the second programming language (e.g., IEC61131 in a TIA Portal engineering environment). Continuing with the example, the robot station 116 can be controlled by automation equipment 101 from Kuka, such as a Kuka robot PLC that is programmed in a third programming language (e.g., Java-based) that is different than the first and second programming languages. The transport station 114 can be controlled by the transport automation equipment 101, which can be from MagneMotion and provide control nodes programmed in a fourth programming language (e.g., Web or C++ based). Thus, without being bound by the specific examples, the functionality of respective automation equipment 101 and product controller 118 can be programmed with languages and tools supported by the equipment vendor of its respective ecosystem.

Figure 2:
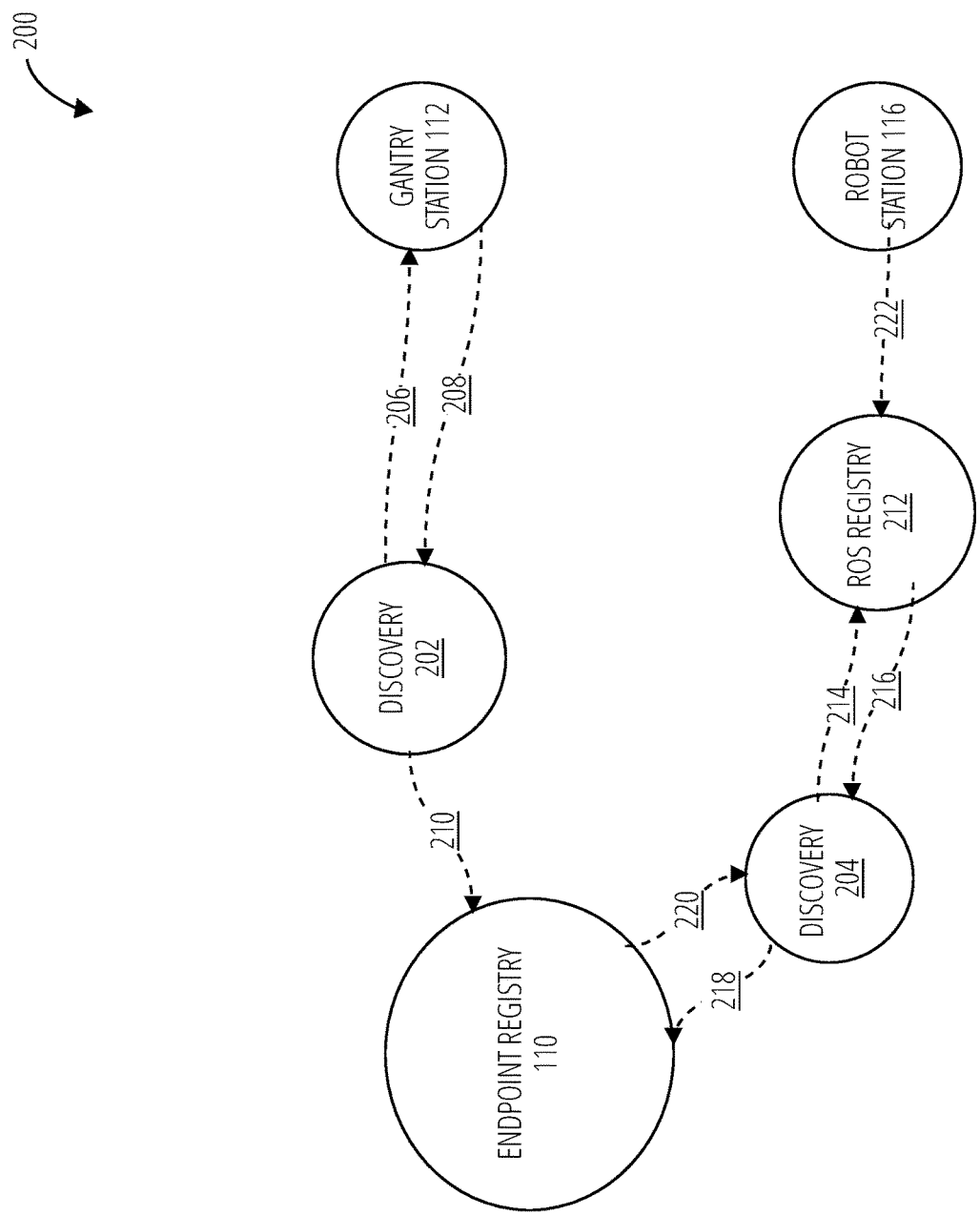
FIG. 2 illustrates operations that can be performed with the endpoint registry in accordance with an example embodiment.

Referring also to FIG. 2, an example operation 200 is shown between the ecosystem that includes the gantry station and the ecosystem that includes the robot station 116. It will be understood that the operation 200 between the two ecosystems is presented as an example, and similar operations may be performed among additional or alternative ecosystems, and all such operations are contemplated as being within the scope of this disclosure. In accordance with an example, the automation equipment 101 of each ecosystem may define a discovery component, such that each ecosystem includes a respective discovery component. The discovery components can be configured to extract information concerning service interfaces and data topics. Such information can be merged into the endpoint registry 110 that can be accessed across the ecosystems. For example, the ecosystem of the gantry station 112 may include a first discovery component 202 configured to retrieve information from the automation equipment 101, in particular a given PLC, of the gantry station 112. Similarly, by way of further example, the robot station 116 may include a second discovery component 204 configured to retrieve information from the automation equipment 101, in particular a given PLC, of the robot station 116. In some cases, a discovery component can be deployed outside of its corresponding PLC. For example, an example PLC can store its interface information in a data block. The data block can be generated based on an interface definition file. In an example, the discovery component can read the data block from the PLC and import the corresponding information into the endpoint registry 110.

With respect to the automation equipment 101 of the gantry station 112, as an example, information concerning supported interfaces and topics may be stored in the automation equipment 101 in data blocks (DB). By way of example, and without limitation, supported interfaces may include a pick and place interface (IPickPlace). Pick and place can refer to any operation that involves a robot picking up objects and placing them somewhere else. By way of further example, topics that are stored in the automation equipment 101 of the gantry station may include data related to an axis position of the gantry station 112 (AxisPosition).

The discovery component 202 of the gantry station 112 can query the gantry station 112, at 206, so as to discover and obtain the interfaces and data topics of the gantry station 112, at 208. After obtaining the information associated with the gantry station 112, the information can be imported into the endpoint registry 110, at 210. In particular, the data block associated with a PLC can be polled or read cyclically so as to import the corresponding information into the endpoint registry 110.

In some cases, a given ecosystem may have its own registry. By way of example, the robot station 116 can be associated with a robot operating system (ROS) registry 212, at 222. Information concerning interfaces and topics related to the robot station 116 can be stored in the ROS registry 212. The discovery component 204 of the robot station 116 can query, at 214, the ROS registry 212, so as to discover and obtain data topics of the robot station 116, at 216. After obtaining information associated with the robot station 116, the information can be imported into the endpoint registry 110, at 218. Further, the endpoint discovery component 204 can update the ROS registry 212 by populating endpoints from other ecosystems. For example, at 220, the second discovery component 204 can retrieve new services from the endpoint registry 110. In addition, at 214, the discovery component 202 can insert the new services that are retrieved into the ROS registry 212, so as to register new services from the endpoint registry 110 with the ROS registry 212. In various examples, the endpoint registry 110 that is available across different ecosystems is agnostic to ROS-native applications or services (e.g., UR5 applications). In example embodiments, however, services, for instance services that are separate from ROS ecosystems (e.g., gantry station 112), can be made available to ROS native applications through the ROS registry 212. Thus, in some cases, information in the endpoint registry 110 can be independent of ecosystems, while a given discovery component can be specific to a given ecosystem. Referring to FIG. 2, for example, the discovery component 204 can synchronize the data between a generic registry, in particular the endpoint registry 110, and the ROS registry 212.

If a particular ecosystem does not have a service registry concept, the endpoint registry 110 that is available across ecosystems can be the service registry for the particular ecosystem. For example, referring to FIG. 2, the ecosystem that includes the gantry station 112 does not have its own service registry, and thus the endpoint registry 110 can be the registry for the gantry station 112. Thus, in accordance with various embodiments, aggregated information concerning existing interfaces and topics, for instance all interfaces and topics related to the industrial automation system 100, can be retrieved from the endpoint registry 110.

In some cases, users can define the semantic of endpoints via an interface description file. A generator module, which can be part of the industrial automation system 100, can generate code that registers and unregisters endpoints with the endpoint registry 110, in accordance with definitions in the corresponding interface description file. Referring also to FIG. 3, example endpoint definitions 300 are shown that can generate endpoint entries in the endpoint registry 110. Any ecosystem can generate respective endpoint entries, for instance by adding an additional endpoint discovery component to the ecosystem that can handle the specifics of the ecosystem. Thus, in some cases, discovery components can be added as needed. In some cases, discovery components are added to an ecosystem as needed, so as to be added incrementally. Further, the discovery components can be added without making changes to the existing ecosystem or product. In an example, the additional endpoint discovery component imports the endpoints (interfaces and topics) from the corresponding ecosystem, and also can update an ecosystem-specific endpoint registry, if there is one.

Thus, as described herein, an industrial system can include a plurality of heterogenous ecosystems that define respective physical assets and automation equipment configured to control the physical assets. In accordance with various embodiments, a first node can register a first endpoint with an endpoint registry. The first endpoint can be associated with a first ecosystem of the plurality of heterogenous ecosystems, and the first ecosystem can define a first programming language native to the automation equipment of the first ecosystem. A second node can discover the first endpoint in the endpoint registry. The second node can be associated with a second ecosystem of the plurality of heterogenous ecosystems that is different than the first node. For example, the second ecosystem can define a second programming language native to the automation equipment of the second ecosystem that is different than the first programming language. In an example, the first endpoint defines a first service interface for interoperating with the first ecosystem, and a first data topic associated with the first ecosystem. In some cases, the first node can define a registry that is specific to the first ecosystem. In an example, the second node can register a second endpoint with the endpoint registry. The second endpoint can be associated with the second ecosystem of the plurality of heterogenous ecosystems. The second endpoint can define a second interface for interoperating with the second ecosystem, and a second data topic associated with the second ecosystem. Further the second node can discover the first endpoint in the endpoint registry. After discovering the first endpoint, the second node can retrieve the first endpoint from the endpoint registry. Then the first endpoint can be implemented such that the first ecosystem interoperates with the second ecosystem. In other examples, the second node defines a local registry specific to the second ecosystem. In such examples, the first endpoint can be imported from the endpoint registry to the local registry that is specific to the second ecosystem.

Figure 4:
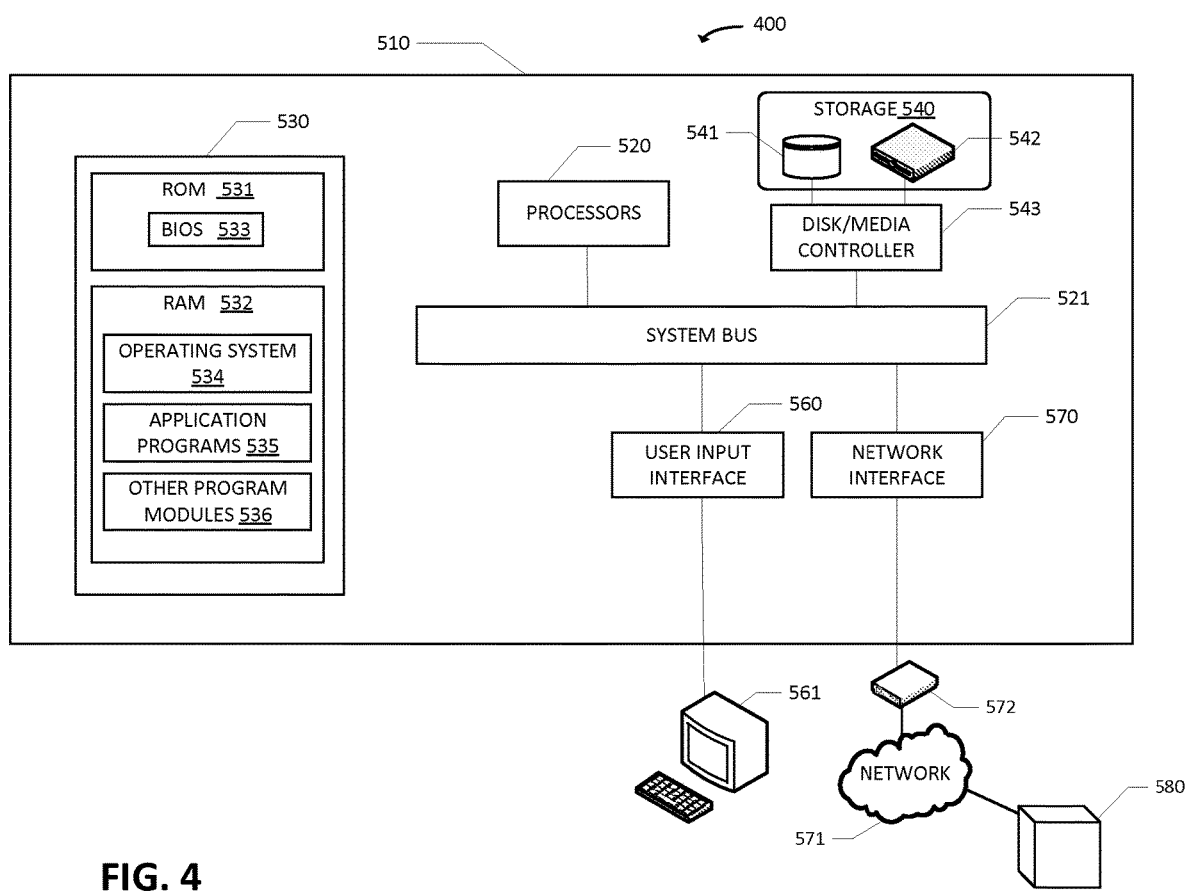
FIG. 4 illustrates an example of computing environment within which embodiments of this disclosure may be implemented.

FIG. 4 illustrates an example of a computing environment within which embodiments of the present disclosure may be implemented. A computing environment 400 includes a computer system 510 that may include a communication mechanism such as a system bus 521 or other communication mechanism for communicating information within the computer system 510. The computer system 510 further includes one or more processors 520 coupled with the system bus 521 for processing the information. The endpoint registry 110 may include, or be coupled to, the one or more processors 520.

The processors 520 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 520 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 521 may include at least one of a system bus, a memory bus, an address bus, or a message bus, and may permit exchange of information (e.g., data (including computer-executable code), signaling, etc.) between various components of the computer system 510. The system bus 521 may include, without limitation, a memory bus or a memory controller, a peripheral bus, an accelerated graphics port, and so forth. The system bus 521 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 4, the computer system 510 may also include a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application programs 535, and other program modules 536. Application programs 535 may also include a user portal for development of the application program, allowing input parameters to be entered and modified as necessary.

The operating system 534 may be loaded into the memory 530 and may provide an interface between other application software executing on the computer system 510 and hardware resources of the computer system 510. More specifically, the operating system 534 may include a set of computer-executable instructions for managing hardware resources of the computer system 510 and for providing common services to other application programs (e.g., managing memory allocation among various application programs). In certain example embodiments, the operating system 534 may control execution of one or more of the program modules depicted as being stored in the data storage 540. The operating system 534 may include any operating system now known or which may be developed in the future including, but not limited to, any server operating system, any mainframe operating system, or any other proprietary or non-proprietary operating system.

The computer system 510 may also include a disk/media controller 543 coupled to the system bus 521 to control one or more storage devices for storing information and instructions, such as a magnetic hard disk 541 and/or a removable media drive 542 (e.g., floppy disk drive, compact disc drive, tape drive, flash drive, and/or solid state drive). Storage devices 540 may be added to the computer system 510 using an appropriate device interface (e.g., a small computer system interface (SCSI), integrated device electronics (IDE), Universal Serial Bus (USB), or FireWire). Storage devices 541, 542 may be external to the computer system 510.

The computer system 510 may also include a field device interface 565 coupled to the system bus 521 to control a field device 566, such as a device used in a production line. The computer system 510 may include a user input interface or GUI 561, which may comprise one or more input devices, such as a keyboard, touchscreen, tablet and/or a pointing device, for interacting with a computer user and providing information to the processors 520.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium of storage 540, such as the magnetic hard disk 541 or the removable media drive 542. The magnetic hard disk 541 and/or removable media drive 542 may contain one or more data stores and data files used by embodiments of the present disclosure. The data store 540 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 1200 may further include the computer system 510 operating in a networked environment using logical connections to one or more remote computers, such as remote computing device 580. The network interface 570 may enable communication, for example, with other remote devices 580 or systems and/or the storage devices 541, 542 via the network 571. Remote computing device 580 may be a personal computer (laptop or desktop), a mobile device, a server, a router, a network PC, a peer device or other common network node, and typically includes many or all of the elements described above relative to computer system 510. When used in a networking environment, computer system 510 may include modem 672 for establishing communications over a network 571, such as the Internet. Modem 672 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

It should be appreciated that the program modules, applications, computer-executable instructions, code, or the like depicted in FIG. 4 as being stored in the system memory 530 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 510, the remote device 580, and/or hosted on other computing device(s) accessible via one or more of the network(s) 571, may be provided to support functionality provided by the program modules, applications, or computer-executable code depicted in FIG. 4 and/or additional or alternate functionality. Further, functionality may be modularized differently such that processing described as being supported collectively by the collection of program modules depicted in FIG. 4 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in the figures may be implemented, at least partially, in hardware and/or firmware across any number of devices.

It should further be appreciated that the computer system 510 may include alternate and/or additional hardware, software, or firmware components beyond those described or depicted without departing from the scope of the disclosure. More particularly, it should be appreciated that software, firmware, or hardware components depicted as forming part of the computer system 510 are merely illustrative and that some components may not be present or additional components may be provided in various embodiments. While various illustrative program modules have been depicted and described as software modules stored in system memory

530, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method performed in an industrial system that comprises a plurality of heterogenous ecosystems that define respective physical assets and automation equipment configured to control the physical assets, the method comprising:
   registering, by a first node, a first endpoint with an endpoint registry, the first endpoint associated with a first ecosystem of the plurality of heterogenous ecosystems, the first ecosystem defining a first programming language native to the automation equipment of the first ecosystem;
   discovering, by a second node, the first endpoint in the endpoint registry, the second node associated with a second ecosystem of the plurality of heterogenous ecosystems that is different than the first node, the second ecosystem defining a second programming language native to the automation equipment of the second ecosystem that is different than the first programming language;
   discovering, by the second node, the first endpoint in the endpoint registry;
   after discovering, retrieving, by the second node, the first endpoint from the endpoint registry; and
   implementing the first endpoint such that the first ecosystem interoperates with the second ecosystem,
   wherein the first endpoint defines a first service interface for interoperating with the first ecosystem, and a first data topic associated with the first ecosystem.

2. The method as recited in claim 1, wherein first node defines a registry specific to the first ecosystem.

3. The method as recited in claim 1, the method further comprising:
   registering, by the second node, a second endpoint with the endpoint registry, the second endpoint associated with the second ecosystem of the plurality of heterogenous ecosystems,
   wherein the second endpoint defines a second interface for interoperating with the second ecosystem, and a second data topic associated with the second ecosystem.

4. The method as recited in claim 1, wherein the second node defines a local registry specific to the second ecosystem, the method further comprising: importing the first endpoint from the endpoint registry to the local registry specific to the second ecosystem.

5. A system for registering and discovering endpoints from a plurality of heterogenous ecosystems that define respective physical assets and automation equipment configured to control the physical assets, the system comprising:
   a processor executing modules; and
   a memory for storing the modules, the modules comprising:
   an endpoint registry configured to store a plurality of endpoints associated with the plurality of heterogenous ecosystems, the endpoint registry further configured to provide the plurality of endpoints to any of the plurality of heterogenous ecosystems;

a first discovery component of a first ecosystem of the plurality of heterogenous ecosystems, the first discovery component configured to register a first endpoint with the endpoint registry, the first ecosystem defining a first programming language native to the automation equipment of the first ecosystem;

a second discovery component of a second ecosystem of the plurality of heterogenous ecosystem that is different than the first ecosystem, the second discovery component configured to discover the first endpoint in the endpoint registry, the second ecosystem defining a second programming language native to the automation equipment of the second ecosystem that is different than the first programming language;

wherein the second discovery component is further configured to:
  discover the first endpoint in the endpoint registry; and
  retrieve the first endpoint from the endpoint registry such that first endpoint can be implemented for the first ecosystem to interoperate with the second ecosystem, wherein the first endpoint defines a first service interface for interoperating with the first ecosystem, and a first data topic associated with the first ecosystem.

6. The system as recited in claim 5, wherein the modules further comprise a local registry specific to the second ecosystem, the local registry configured to import the first endpoint from the endpoint registry so as make the first endpoint accessible to the second ecosystem.

7. The system as recited in claim 5, wherein the modules further comprise a local registry specific to the first ecosystem, the local registry configured to retrieve a second endpoint from endpoint registry, the second endpoint defining a second interface for interoperating with the second ecosystem, and a second data topic associated with the second ecosystem.

8. The system as recited in claim 5, wherein the second discovery component is further configured to register a second endpoint with the endpoint registry, the second endpoint associated with the second ecosystem of the plurality of heterogenous ecosystems, wherein the second endpoint defines a second interface for interoperating with the second ecosystem, and a second data topic associated with the second ecosystem.

\* \* \* \* \*